W. V. TURNER.
STRAIGHT AIR EMERGENCY BRAKE.
APPLICATION FILED APR. 6, 1908.
971,808.
Patented Oct. 4, 1910.
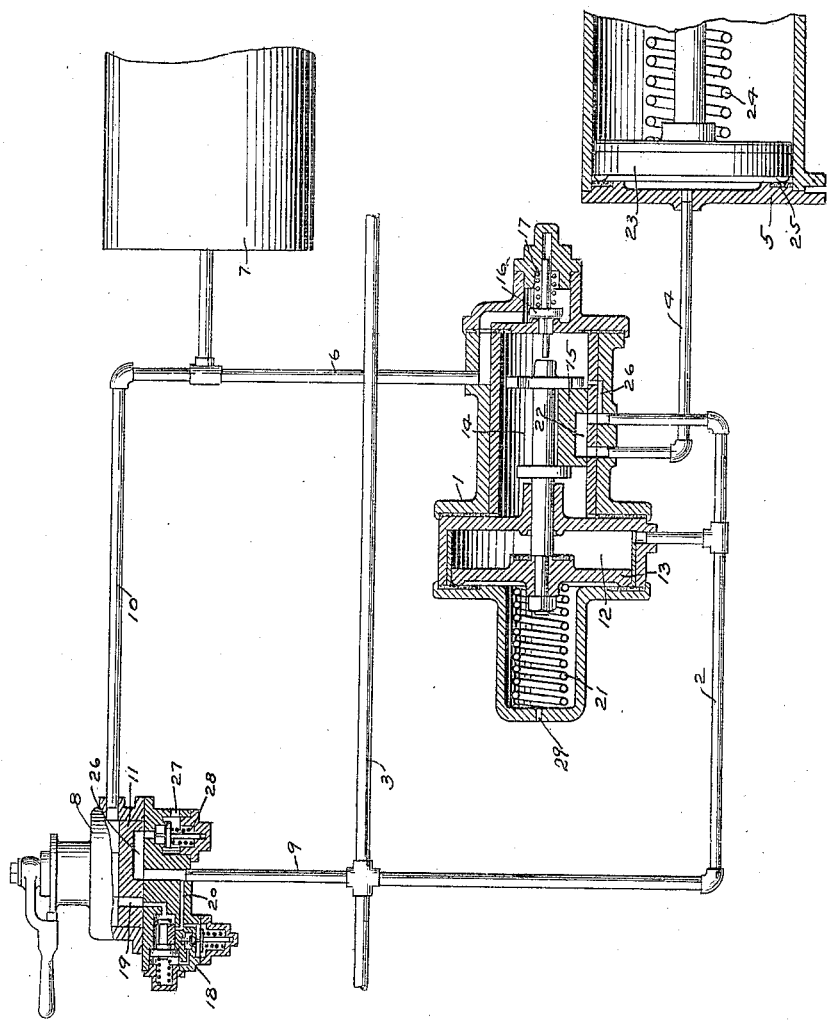
WITNESSES
INVENTOR

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

STRAIGHT-AIR EMERGENCY-BRAKE.

971,808.

Specification of Letters Patent.    Patented Oct. 4, 1910.

Application filed April 6, 1908. Serial No. 425,493.

*To all whom it may concern:*

Be it known that I, WALTER V. TURNER, a citizen of the United States, residing at Edgewood, in the county of Allegheny and State of Pennsylvania, have invented new and useful Improvements in Straight-Air Emergency-Brakes, of which the following is a specification.

This invention relates to fluid pressure brakes, and more particularly to a brake system having an automatic emergency valve device on each car adapted to cause an emergency application of the brakes upon a sudden reduction in train pipe pressure, and an independent or straight air pipe or passage for supplying air to and releasing air from the brake cylinder.

The principal object of my invention is to provide an improved apparatus of the above character in which a single pipe line is employed both as the train pipe for the emergency valve device and as the independent or straight air pipe for controlling the straight air application and release of the brakes.

In the accompanying drawing, the single figure is a diagrammatic view of an air brake equipment for one car, with my improvements applied thereto and showing the brake valve and the emergency valve device in section.

According to the construction illustrated in the drawing, the apparatus on the car comprises an automatic emergency valve device 1, a combined straight air and emergency pipe line 3, to which the valve device 1 is connected by a branch pipe 2, a brake valve 8 connected by pipe 9 to pipe line 3 and by pipe 10 to a storage reservoir 7 which may be the usual main reservoir maintained at a predetermined degree of pressure by an air pump or compressor. The valve device 1 is also connected to brake cylinder 5 by pipe 4 and to main reservoir 7 by pipe 6, and is provided with a piston chamber 12 containing piston 13, and valve chamber 14, containing slide valve 15 adapted to be operated by piston 13. Said piston is also adapted to actuate a puppet valve 16 for controlling communication from pipe 6 and the reservoir 7 to valve chamber 14, the valve 16 being normally held seated by a suitable spring 17. The chamber 12 at the inner side of piston 13 is connected by pipe 2 to the train line 3 and the opposite side of the piston is subject to the pressure of a spring 21.

The brake valve 8 comprises a rotary valve 11 and a feed valve 18 of the usual construction for maintaining the pressure in the train line at a predetermined degree of pressure. In the release position of the brake valve 8, as shown in the drawing, a port 19 in the rotary valve 11 establishes communication from the rotary valve chamber, which is open to reservoir 7 through pipe 10, to feed valve 18, and air is supplied thereby through a passage 20 to the pipe 9 and the straight air emergency pipe 3. The feed valve is preferably adjusted so as to maintain a comparatively low degree of pressure in train line 3, say about ten pounds, and spring 21 acting on piston 13 is adapted to be compressed by a fluid pressure of ten pounds on the opposite side of the piston, so that normally said piston is maintained in its extreme outer position, preferably seated on a gasket to prevent leakage, the spring chamber being provided with a vent port 29, so that any leakage past the piston 12 may escape to the atmosphere and thus prevent equalization of fluid pressure on said piston.

The brake cylinder pipe 4, in the normal position of piston 13, is connected by cavity 22 in the slide valve 15 with pipe 2, and consequently the brake cylinder piston 23 is in open communication with pipe 3. As a fluid pressure is normally maintained in the pipe 3 and on brake cylinder piston 23, the brake cylinder piston spring 24 is made of such tension as to maintain the piston at its inner position against the normal degree of fluid pressure, being preferably provided with a gasket seat 25 to prevent leakage.

In order to prevent the slide valve 15 from being lifted from its seat by fluid pressure in cavity 22, I preferably provide a bypass 26 from pipe 4 to valve chamber 14, so that the pressure in said chamber corresponds with the pressure on the under face of the valve.

In the operation of my invention, a straight air application of the brakes may be effected by turning the brake valve handle to a position for admitting air from the rotary valve chamber to the pipe 9 and then back to lap position, as will be readily understood. The fluid at the increased pressure in pipe 3 then flows through cavity 22 and brake cylinder pipe 4 to the brake cylinder, causing the brake cylinder piston 23 to move outwardly to apply the brakes. Further increases in pressure may be made by the usual movement of the brake valve to the straight air application position. The brakes may be released by turning the brake valve handle to release position, in which a cavity 26 in the rotary valve connects pipe 9 with exhaust port 27, as shown in the drawing. In order to prevent the exhaust of all air in the train line, I interpose a retaining valve device 28 of suitable construction in the exhaust passage between the rotary valve and exhaust port 27, adjusted to ten pounds or whatever the normal degree of pressure maintained in the train line may be. Thus the exhaust is closed upon reduction of pressure in the train line to the normal degree.

A sudden reduction in pressure in the train line as may be caused by a break in-two of pipe 3 or by turning the brake valve handle to emergency position, reduces the pressure on the inner face of piston 13 to less than the pressure of the spring 21, so that the piston is immediately shifted to its inner position by the spring. In this inner position the port opening of brake cylinder pipe 4 is uncovered by the slide valve 15 and puppet valve 16 is lifted from its seat, so that air from the reservoir 7 flows to the valve chamber 14 and thence by pipe 4 to the brake cylinder, causing an emergency application of the brakes. The piston 12 may be provided with an inner gasket seat as shown, in order to prevent leakage from valve chamber 14 to the train line. The brakes may be released after an emergency application by turning the brake valve handle to release position when air is supplied by feed valve 18 to the train line 3 and inner face of piston 13, so that said piston is returned to its normal outer position and the brake cylinder pressure is released through cavity 22, as will be apparent.

It will of course be understood that two or more cars may be equipped as above described and coupled together, and if desired the usual main reservoir pipe may be employed for connecting the reservoirs 7 throughout the train, so that each pump or air compressor is utilized in supplying compressed air to the brake system, and the operation on the several cars will be the same as on the single car, as above described.

Having now described my invention, what I claim as new and desire to secure by Letters Patent, is:—

1. In a fluid pressure brake, the combination with a brake cylinder, of a train pipe line normally open to the brake cylinder, means for increasing the pressure in said train pipe line and brake cylinder to apply the brakes, and an automatic valve device operating upon a reduction in the train pipe line pressure for supplying air to the brake cylinder.

2. In a fluid pressure brake, the combination with a brake cylinder, of a train pipe line normally in open communication with the brake cylinder, a brake valve for increasing the pressure in the train pipe line and brake cylinder to apply the brakes, and an automatic valve device operating upon a reduction in train pipe line pressure for supplying air to the brake cylinder.

3. In a fluid pressure brake, the combination with a brake cylinder, of a train pipe line, a brake valve for supplying and releasing air through said train pipe line to and from the brake cylinder, and an automatic valve device operating upon a reduction in train pipe line pressure for supplying air to the brake cylinder.

4. In a fluid pressure brake, the combination with a brake cylinder and a train pipe line, of an emergency valve device operating upon a sudden reduction in pressure in said train pipe line to supply air to the brake cylinder and normally establishing communication from the train pipe line to the brake cylinder, and a brake valve for supplying air to the brake cylinder through said train pipe line.

5. In a fluid pressure brake, the combination with a train pipe line and a brake cylinder normally communicating with said train pipe line, of means operating upon either an increase or a decrease in pressure in said train pipe line for supplying air to the brake cylinder.

6. In a fluid pressure brake, the combination with a brake cylinder, of a train pipe line normally open to the brake cylinder, a brake valve for normally maintaining a predetermined pressure in the train pipe line and adapted to increase the pressure in the train pipe line to apply the brakes, and an automatic valve device operated by a sudden reduction in pressure in said train pipe line for supplying air to the brake cylinder.

7. In a fluid pressure brake, the combination with a brake cylinder, of a train pipe line normally open to the brake cylinder to permit the flow of air in either direction, a brake valve for normally maintaining a predetermined pressure in the train pipe line, and an automatic valve device operated by a reduction in pressure in the train pipe line for cutting off communication from the train pipe line to the brake cylinder and for supplying air to the brake cylinder.

8. In a fluid pressure brake, the combination with a brake cylinder, of a train pipe line normally communicating with the brake cylinder, a brake valve having ports for normally maintaining a predetermined degree of pressure in said train pipe line and for increasing the pressure therein to apply the brakes, and an automatic valve device operating upon a reduction in pressure in the train pipe line for closing communication from the train pipe line to the brake cylinder and for supplying air to the brake cylinder.

9. In a fluid pressure brake, the combination with a brake cylinder having a spring adapted to maintain the brake cylinder piston in release position against a predetermined degree of fluid pressure, of a train pipe line communicating with said brake cylinder, a brake valve adapted to maintain a predetermined degree of pressure is said train pipe line, and having means for increasing the pressure therein to apply the brakes, and an automatic valve device operated by a sudden reduction in train pipe line pressure for closing communication from the train pipe line to the brake cylinder, and for supplying air to the brake cylinder.

In testimony whereof I have hereunto set my hand.

WALTER V. TURNER.

Witnesses:
R. F. EMERY,
WM. M. CODY.